L. LIPMAN.
PROCESS FOR PREPARING FOOD.
APPLICATION FILED MAY 31, 1916.
1,208,175.
Patented Dec. 12, 1916.
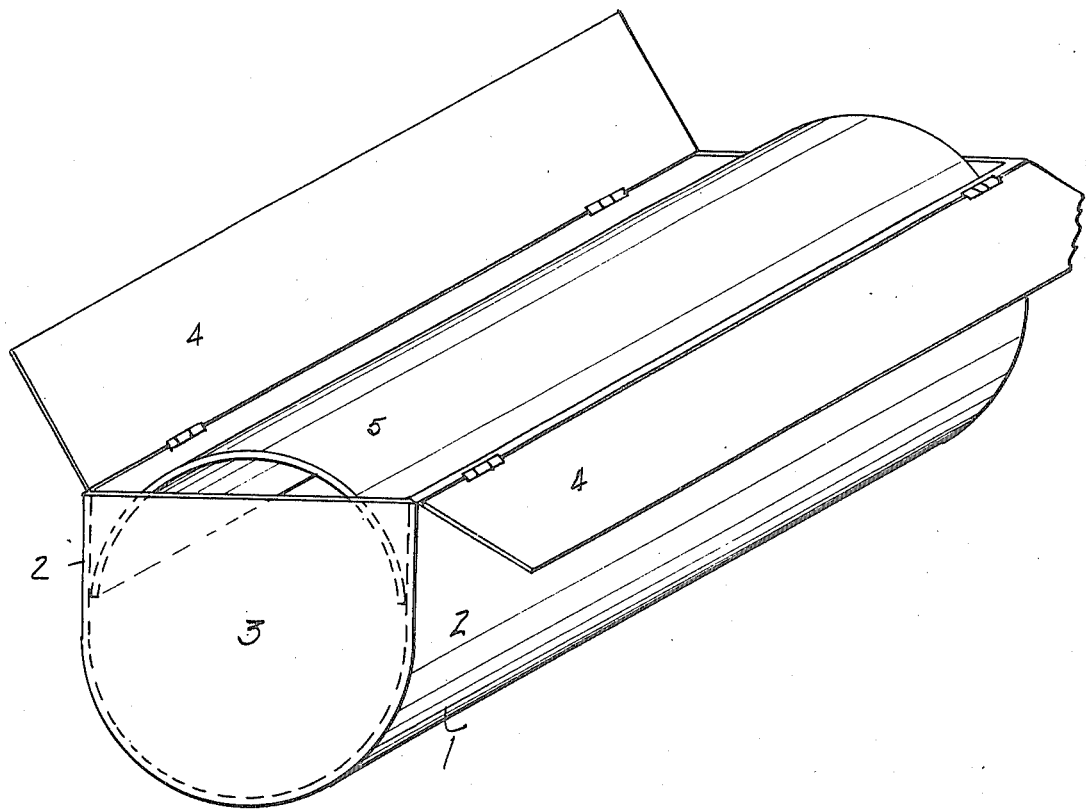
WITNESS
INVENTOR
BY
ATTORNEY

UNITED STATES PATENT OFFICE.

LOUIS LIPMAN, OF SEATTLE, WASHINGTON.

PROCESS FOR PREPARING FOOD.

1,208,175.  Specification of Letters Patent.  Patented Dec. 12, 1916.

Application filed May 31, 1916. Serial No. 100,842.

*To all whom it may concern:*

Be it known that I, LOUIS LIPMAN, a citizen of the United States, and a resident of Seattle, in the county of King and State of Washington, have invented certain new and useful Improvements in Processes for Preparing Food.

This invention relates to a process for preparing food, and more particularly to process for the preparing and molding of tongues, and has for its principal object, to provide a process in which hot boiled beef tongues, and the like, are properly assembled, molded and prepared for eating.

Another object is to provide an improved and novel form of mold in which the tongues are formed.

Other objects will appear as my invention is more fully explained in the following specification, illustrated in the accompanying drawings, and pointed out in the appended claims:

In the drawing the figure is a perspective view of my mold shown in open position.

Referring more particularly to the drawing numeral 1 indicates a semi-circular bottom member having up-standing and parallel sides 2, and ends 3. The mold is provided with doors 4, one upon either side thereof, and adapted to fold inwardly. A semi-circular and loose member 5 is provided and is adapted to fit within the mold. In operation the tongues are placed within the mold, as will be more fully described later. The member 5 is then placed above them, and the door 4 closed down on top of the member 5, after which the mold is placed in a form and subjected to pressure from the top, thereby compressing the tongue into a solid mass.

Referring more to the process, which includes the pickling of fresh tongue, preferably beef tongue, in any suitable pickle, such as 1 gallon of water, 6 pounds of salt, 2 pounds of sugar, and ½ ounce of saltpeter. After the tongues have been sufficiently pickled, they are withdrawn from the pickle, and boiled or otherwise cooked. While hot the tongues are skinned and placed within the mold as previously described. In placing within the mold an important step in my process is the placing of the tongues alternate tip and butt, so that a uniform mass as to shape and quality of tongue is secured. After sufficient tongues have been placed within the mold they are subjected to pressure, as previously described, and allowed to cool within the mold. After removal from the mold the mass of tongue is securely cemented together by the gelatin substance which is extracted from the hot tongue. After cooling and removing from the mold, the tongue may be dipped in a solution of gelatin which in itself is edible, and forms a protective coating around the mass of tongue. In this form the tongue will keep for a long time, and form an even and uniform bulk. In restaurants and the like, where cold tongue is served sliced, it is very desirable that all slices be of the same quality, therefore the alternate tip and butt method insures a uniform product throughout the entire roll.

While I have shown a particular form of embodiment of my invention, I am aware that many minor changes therein will readily suggest themselves to others skilled in the art without departing from the spirit and scope of the invention, and I therefore desire to avoid being limited to the exact claims.

Having described my invention, what I claim as new and desire to protect by Letters Patent, is—

1. A process for forming tongue loaf which includes boiling beef tongues, skinning said tongues while hot, placing the tongues while hot in a mold with the tips and butts alternating, pressing the mold tightly together and allowing them to cool, whereby the mass of tongue is solidified by the gelatin constituents of the tongue into a mass of uniform shape and quality, and coating the pressed mass of tongues directly with an edible gelatin.

2. The process of placing hot boiled beef tongues in a sectional mold with the tips and butts of the said tongues alternating, compressing the mold and its contents and allowing them to cool in the mold, and dipping the molded mass of tongues into an edible gelatin in order to give a protective coating.

LOUIS LIPMAN.